Dec. 2, 1958     T. V. WILLIAMS     2,862,286

TOOL AND TOOL HOLDER

Filed June 10, 1955

Inventor
Thurston V. Williams
by Roberts, Cushman & Grover
Att'ys

United States Patent Office 2,862,286
Patented Dec. 2, 1958

2,862,286
TOOL AND TOOL HOLDER

Thurston V. Williams, Milford, N. H., assignor to The O. K. Tool Company, Inc., Milford, N. H., a corporation of New Hampshire Application June 10, 1955, Serial No. 514,502

2 Claims. (Cl. 29—105)

This invention relates to machines of the type having tools removably mounted in tool holders so that they can readily be removed for resharpening or replacement and the objects of the invention are to provide an arrangement which is simple and economical to manufacture, which is durable and reliable in use, in which the parts can be quickly and easily assembled or disassembled and in which the tools may be positioned in the tool holders with accuracy and facility.

According to the present invention the apparatus comprises a tool holder having an opening extending therethrough, the rearward end of the opening being threaded, in combination with a plug threading into the aforesaid end from the rear, a sleeve sliding into the opening from the front and seating on the forward end of the plug, the bore of the sleeve being tapered rearwardly, a tool sliding into the sleeve from the front, the tool being tapered to fit the sleeve and having a threaded bore extending along its axis from its rearward end, and a screw extending through the plug and threading into the tool bore to draw the tool into the sleeve and wedge it therein. Preferably the screw has a collar in front of the plug to prevent the screw from dropping out of the plug and the sleeve is split longitudinally to permit it to expand against the wall of the aforesaid opening. In the preferred embodiment the wall of the opening and the outer periphery of the tool have longitudinal grooves registering with each other and the sleeve has a longitudinal slot registering with the grooves, with a key fitting in the grooves and slot to restrain relative rotation of the parts.

Figure 1:
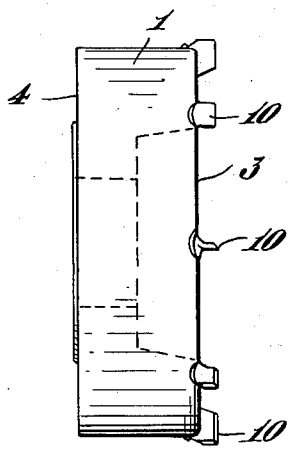
Figure 2:
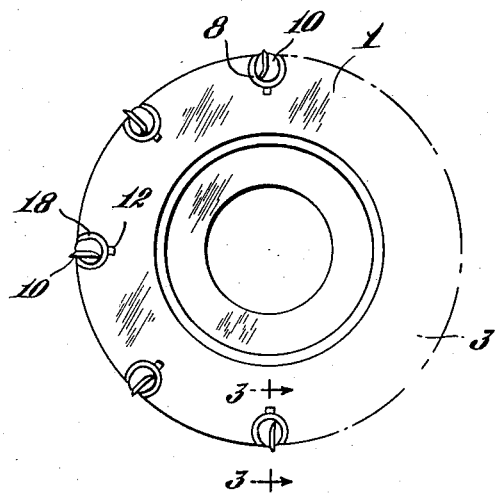
Figure 3:
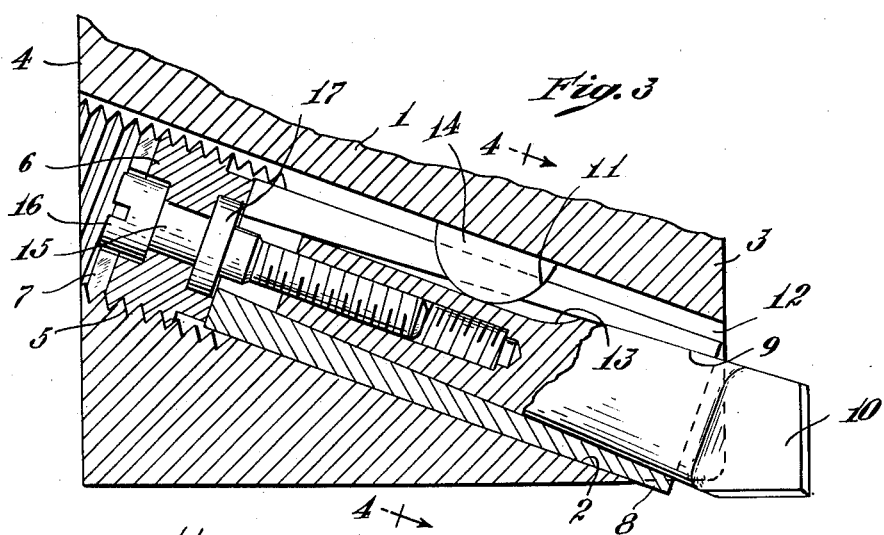
Figure 4:
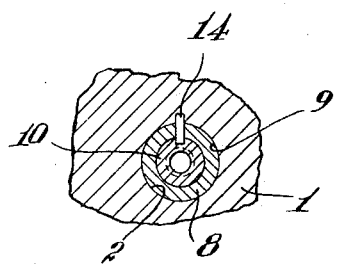
Figure 5:
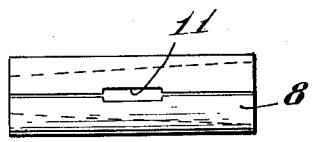

For the purpose of illustration a typical embodiment of the invention is shown in the accompanying drawings in which:

Fig. 1 is a side elevation;
Fig. 2 is a front elevation;
Fig. 3 is an enlarged section on line 3—3 of Fig. 2;
Fig. 4 is a section on line 4—4 of Fig. 3 of an intermediate scale; and
Fig. 5 is a side view of the aforesaid sleeve.

The particular embodiment of the invention chosen for the purpose of illustration comprises a cylindrical body 1 adapted to rotate about its axis, the body being provided with a plurality of cylindrical openings 2 which extend obliquely through the body between its front and rear faces 3 and 4, the rearward ends of the openings being threaded at 5. Threaded into each of said ends is an adjustable plug 6 which has in its rear end radial slots 7 to accommodate a spanner wrench. Into the opposite unthreaded end of each opening 2 is loosely fitted a sleeve 8 which has a tapered bore 9. Fitting in the tapered bore is a tool 10 having the same taper. Each sleeve 8 has a longitudinal slot 11 opposite a groove 12 in one side of the opening 2 and each tool has a groove 13 in its corresponding side, a key 14 fitting in the grooves and slot to restrain relative rotating of the parts while permitting relative endwise movement.

Extending through each plug 6 is a machine screw 13 which threads into the rear end of the tool, the screw having an integral head 16 and a collar 17 pressed or otherwise mounted thereon to prevent endwise movement of the screw relatively to the plug while permitting free rotation.

To assemble each set of parts the plug 6 is threaded into the desired location from the rear, the sleeve 8 is seated on the plug from the front with the key 14 in position, and the tool 10 is drawn into the sleeve and wedged tightly therein by rotating the screw 15 clockwise. To remove the tools the screws are turned counterclockwise to force the tools out of the sleeves. When the tools are resharpened the plugs 6 are advanced a distance corresponding to the amount the tools have been ground back so that, when the tools are replaced, they project from the body the same distance as before resharpening.

It should be understood that the present disclosure is for the purpose of illustration only and that this invention includes all modifications and equivalents which fall within the scope of the appended claims.

I claim:

1. Apparatus of the character referred to comprising a tool holder having an opening extending therethrough, the rearward end of the opening being threaded, a plug threading into said end from the rear, a sleeve sliding into the opening from the front and seating on the forward end of the plug, the bore of the sleeve tapering rearwardly, a tool sliding into the sleeve from the front, the tool being tapered to fit the sleeve and having a threaded bore extending along its axis from its rearward end, both the sleeve and the tool being adjustable axially of the bore, and a screw extending loosely through the plug and threading into said tool bore, the head of the screw seating on the plug so as to draw the tool into the sleeve and wedge it therein.

2. Apparatus of the character referred to comprising a tool holder having an opening extending therethrough, the rearward end of the opening being threaded, a plug threading into said end from the rear, a sleeve sliding into the opening from the front and seating on the forward end of the plug, the bore of the sleeve tapering rearwardly, a tool sliding into the sleeve from the front, the tool being tapered to fit the sleeve and having a threaded bore extending along its axis from its rearward end, both the sleeve and the tool being adjustable axially of the bore, a screw extending loosely through the plug and threading into said tool bore, the head of the screw seating on the plug so as to draw the tool into the sleeve and wedge it therein, the wall of said opening and the outer periphery of said tool having longitudinal grooves registering with each other and said sleeve having a longitudinal slot registering with said grooves, and a key fitting in said grooves and slot to restrain relative rotation of the parts.

References Cited in the file of this patent
UNITED STATES PATENTS

| | | |
|---|---|---|
| 690,763 | Parker | Jan. 7, 1902 |
| 726,248 | Boyer | Apr. 28, 1903 |
| 1,415,339 | Hall | May 9, 1922 |
| 2,105,757 | Rosenberg | Jan. 18, 1938 |
| 2,253,028 | Hassig | Aug. 19, 1941 |
| 2,277,290 | Bennett | Mar. 24, 1942 |
| 2,368,794 | Wilson | Feb. 6, 1945 |
| 2,433,127 | Kinzbach | Dec. 23, 1947 |
| 2,450,788 | Foster | Oct. 5, 1948 |
| 2,553,761 | Gooding | May 22, 1951 |

FOREIGN PATENTS

| | | |
|---|---|---|
| 206,240 | Switzerland | July 31, 1939 |
| 619,549 | Great Britain | Mar. 10, 1949 |
| 622,342 | Great Britain | Apr. 29, 1949 |
| 699,595 | Great Britain | Nov. 11, 1953 |